(12) United States Patent
Bilsing

(10) Patent No.: US 6,199,928 B1
(45) Date of Patent: Mar. 13, 2001

(54) COUPLER FOR CONNECTING WORKPIECE GRIPPERS WITH A MANIPULATING DEVICE

(76) Inventor: Alfred Bilsing, Am Echenbach 23, D-57439 Attendorn (DE)

( * ) Notice: Subject to any disclaimer, the term of this patent is extended or adjusted under 35 U.S.C. 154(b) by 0 days.

(21) Appl. No.: 09/262,591

(22) Filed: Mar. 5, 1999

(30) Foreign Application Priority Data

| Mar. 5, 1998 | (DE) | 198 09 371 |
| Jan. 16, 1999 | (EP) | 99100752 |

(51) Int. Cl.[7] .................. B25J 15/04; B66C 1/10
(52) U.S. Cl. .............. 294/86.4; 901/41; 279/900; 403/373
(58) Field of Search ............ 294/86.4, 88; 403/31, 403/373; 901/30, 41; 414/729, 730; 279/4.01, 4.07, 900, 901, 904

(56) References Cited

U.S. PATENT DOCUMENTS

| 4,545,723 | * | 10/1985 | Clark | 294/86.4 |
| 4,636,135 | * | 1/1987 | Bancon | 294/86.4 |
| 4,664,588 | * | 5/1987 | Newell et al. | 294/86.4 |
| 4,793,053 | * | 12/1988 | Zuccaro et al. | 294/86.4 |
| 4,826,230 | * | 5/1989 | Truchet | 901/41 |
| 5,035,457 | * | 7/1991 | Tveit et al. | 294/86.4 |
| 5,782,571 | * | 7/1998 | Hufford et al. | 901/41 |

FOREIGN PATENT DOCUMENTS 37 10 472 A1   10/1988   (DE).

OTHER PUBLICATIONS

Von Manfred Weck et al., "Dem Steilkegel zu Leibe geruckt", VDI–Z 132 (1990), Nr–10 Oct.

* cited by examiner

*Primary Examiner*—Dean J. Kramer
(74) *Attorney, Agent, or Firm*—Larson & Taylor PLC

(57) ABSTRACT

The motor-actuable coupler is used for connecting workpiece grippers with a manipulating device, in particular a robot, which passes on workpieces from one stamping press to the next. The coupler consists of a fixed element (12, 66, 80, 38) on the drive side and a connecting element (10, 54) on the gripper side. Since normally a very large number of different workpiece grippers are employed and the connecting elements on the gripper side entail great costs, it is proposed that the fixed element of the coupler has a collet chuck (66, 74, 80, 38), and that the connecting element (10, 54) is a tube section, which can be centered in the fixed element (12, 66, 80) spaced apart from the clamping area (at 68, 76) located at the front end of the collet chuck. The tube section (10) is preferably centered by clamping faces (70, 78) and/or by cone surfaces (58) at its end which can be inserted into the collet chuck (14).

14 Claims, 3 Drawing Sheets

COUPLER FOR CONNECTING WORKPIECE GRIPPERS WITH A MANIPULATING DEVICE

FIELD OF THE INVENTION

The invention relates to a motor-actuable coupler for connecting workpiece grippers with a manipulating device, in particular for the interlinking of stamping presses, consisting of a fixed element on the drive side and a connecting element on the gripper side.

BACKGROUND OF THE INVENTION

The workpiece grippers of manipulating devices, or respectively robots, must be individually matched to the workpieces. In connection with sheet metal parts, for example for motor vehicles, they normally have the form of a tube-shaped boom of, for example, 2 m length, with several boom extensions, to which suction grippers and/or clamping grippers are attached. Since the sheet metal parts are being deformed in several stamping presses, which are linked with each other, until they have their final shape, and since a specially designed workpiece gripper in accordance with the respective intermediate stage is required for a transfer to the next stamping press, 120 different workpiece grippers are required in order to produce 20 different sheet metal parts for a defined vehicle model on a line with, for example six stamping presses. So that the stocks of sheet metal parts can be kept as low as possible, the press tools are mostly exchanged in the course of only a few hours. Accordingly, in one work day it is often necessary to change the workpiece grippers of all transfer robots at the stamping presses ten times.

There are simple connections, which can be manually made by attachment screws, between the boom of a workpiece gripper and the portion of the robot supporting it, which is driven in a controlled manner. However, in view of the very high capital cost of a stamping press line per unit of time, a rapid exchange of the workpiece grippers must be relied upon. This requires quick acting couplers, which are motor-actuated when automatic gripper changing systems are used.

Such known couplers of this kind typically consist of a housing-like fixed element on the drive side, into which a matched connecting element coupled with the boom can be inserted and locked in place by means of interlocking connecting elements, for example stop bolts or hooks extending behind transverse pins. Since all workpiece grippers must be equipped with such a connecting element, considerable total costs result because of the multitude of grippers.

OBJECT AND SUMMARY OF THE INVENTION

It is the object of the invention to create a motor-actuable coupler of the type mentioned at the outset, which permits very rapid coupling and uncoupling, but which has a very simple structure.

The above object is attained in accordance with the invention in that the fixed element of the coupler has a collet chuck and the connecting element is a tube section, which can be centered in the fixed element spaced apart from the clamping area located at the front end of the collet chuck.

Collet chucks are used, for example, for clamping workpieces during lathe operations. In that process only comparatively low bending moments occur, because the cutting tools act on the workpiece at a short distance from the chuck.

In contrast to this workpiece grippers have to absorb considerable moments in particular at stamping presses. At the same time very high demands are made on accuracy. In spite of a long boom, large load stresses and great accelerations, a very narrowly delimited repetitive accuracy of the positioning movements is demanded. For this reason comparatively large connecting elements are provided on the gripper side of known quick change couplers, through which all forces are transferred from the boom to the robot arm, and which must be produced with several fitting surfaces in order to assure exact seating in the fixed element. In contrast to this, with the proposed coupler the structure can be much simpler, since no additional connecting element and no fitting surfaces are required at the point where the collet chuck of the fixed element of the coupler grips a tube section of the boom and clamps it. On the gripper side, a bezel on the front face of the end of the boom which can be inserted into the coupler is sufficient for centering the two coupler elements at a place spaced apart from the clamping place. Alternatively or additionally it is possible to use a collet chuck with two clamping areas arranged at a distance from each other. In both cases no additional connecting element is needed on the gripper side. The frontmost tube section of the boom is simply used as such.

In a preferred embodiment, on the gripper side the conical centering surface is provided on a cover, which is fitted or pressed into the end of the tube section which can be inserted into the collet chuck. This embodiment has the advantage that the cover can support the plug connector elements for compressed air or other power or control connections of the workpiece gripper on the gripper side.

In a further preferred embodiment of the invention, the collet chuck consists in a manner known per se of a bushing, which is conically widened on a longitudinally slit end, of a fitted inner cone on a housing receiving the slit bushing, and of a power cylinder for the axial movement of the slit bushing in relation to the housing. The centering cone surface is located on the side of the fixed element on a holder connected with the slit bushing and the portion of the power cylinder, which can be moved in relation to the housing. Usefully the piston of the power cylinder slides directly in a bore of the housing, so that no additional part is required for the cylinder. A very simple construction of the fixed element of the coupler as a whole is obtained if the housing has a stepped, continuous bore, which is closed at the rear end by a cover and into which a tight separating wall is inserted between the piston of the power cylinder and the holder.

Surprisingly, neither the coupling process nor the centering function is negatively affected if in an advantageous embodiment of the invention the conical centering surface on the side of the fixed element of the coupler is formed on the holder or on another part which is moved in the course of tightening the collet chuck. The reason for this is on the one hand the radial guidance of the holder or another part in the cylinder bore of the housing, on the other hand that a comparatively short axial displacement path of the longitudinally slit bushing of the collet chuck and the holder connected with it is sufficient for causing the clamping and the release of the tube section inserted into the collet chuck. During the short axial displacement it is possible to assure the mutual contact of the conical centering surfaces by means of a force exerted on the boom, if not anyhow after the insertion of its end into the collet chuck the boom is taken along by friction in the course of the axial movement of the slit bushing.

It has been found that it is advantageously possible to connect power-carrying lines, and possibly even control lines, with the holder, in spite of the necessary movements of the holder for tightening and releasing the collet chuck. In a further preferred embodiment of the invention it is therefore provided that the holder is equipped with several compressed air and/or vacuum connections, which extend outward through holes in the housing, which holes are of sufficient size for making the axial movements of the holder in the housing possible. Axially oriented plug connectors, which suitably are furthermore provided on the holder are connected with the compressed air and/or vacuum connections and in the course of inserting the connecting element into the collet chuck can be tightly connected with counter plug connectors arranged on the closing cover of the boom, which are connected with pneumatically actuable elements on the workpiece gripper.

Exemplary embodiments of the invention will be explained in more detail in what follows by means of the drawings.

DETAILED DESCRIPTION OF THE PREFERRED EMBODIMENTS

Figure 1:
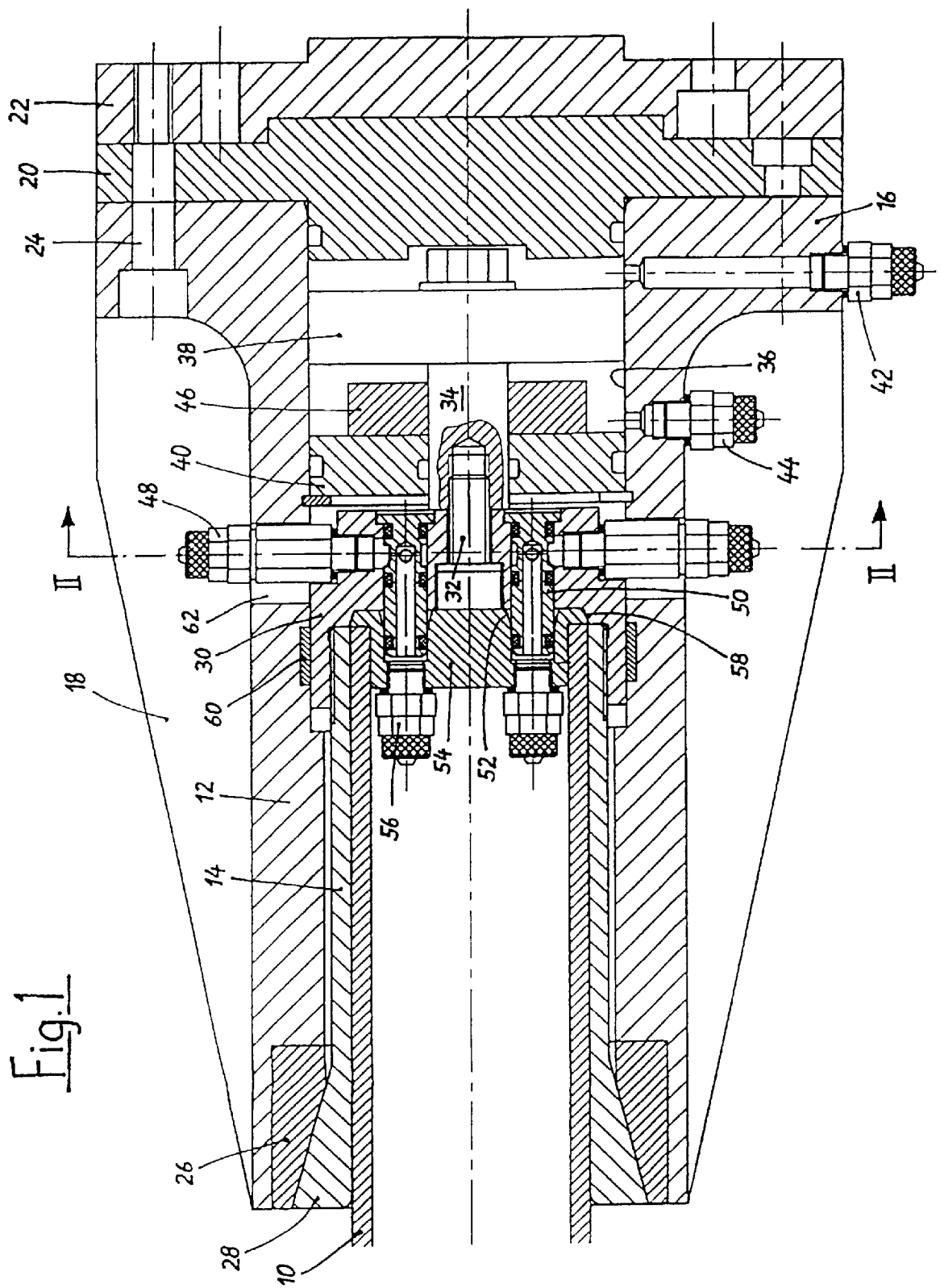
FIG. 1 represents an axial longitudinal section through a coupler of a workpiece gripper with a robot arm.

Only the outermost tube section 10 of the boom of a workpiece gripper for sheet metal parts is represented in FIG. 1. In the individual case, and depending on the size of the workpiece and the spatial conditions in the stamping presses, from which the workpieces are to be removed, or respectively in which they are to be inserted, the tube section can have a length of more than 2 m. Other workpiece grippers which are to be fastened by means of the same coupler on the robot arm possibly only have a short tube section 10. It is understood that the tube-shaped ends of all workpiece grippers intended to be held by means of the same coupler must have the same exterior diameter and a sufficient length, so that they can be exchangeably inserted into the coupler in defined positions.

While the tube section 10 constitutes the connecting element of the coupler on the gripper side, its fixed element attached on the drive side, i.e. at the end of a robot arm, essentially consists of a housing 12, which receives a collet chuck 14. The housing 12 has the shape of a cylinder provided with a radial flange 16 on its rear end and is reinforced by means of several exterior ribs 18 extending over its length. The rear end of the cylindrical housing 12 is tightly closed by means of a cylinder cover 20, which is screwed on the flange 16 from the rear. So that the same coupler can be attached to the differently designed ends of different robots, fastening takes place via an adapter disk 22, which is matched on the one side with the fastening surface of the respectively associated robot, and on its oppositely located surface to the outside of the cylinder cover 20. Following the fastening of the adapter disk 22 on the end of the robot arm, the coupler is screwed to the adapter disk 22 by means of screws which are inserted through holes 24 in the flange 16 and the cylinder cover 20, and is centered by means of centering bores 25.

The housing 12 preferably is a cast part made of an aluminum alloy. Since this material is comparatively soft, a ring-shaped insert 26 of steel, whose inner circumferential surface conically widens from the inside to the outside, has been placed on the inside of the front end of the cylindrical housing 12. It cooperates with the front end 28 of the collet chuck 14, which is conically and radially outwardly widened at the front. Otherwise, this has the form of a bushing of hardened steel with several slits distributed over the circumference and extending over the larger portion of the length. This bushing is screwed with its rear end into a holder 30, which is connected by means of a fastening screw 32 with the piston rod 34 of a piston 38, which is guided in an axially displaceable manner in the cylinder bore 36 of the housing 12. The cylinder chamber receiving the piston 38 is limited at the front by a separating wall 40, which has been fixedly end tightly inserted into the cylinder bore 36. The piston 38 is displaced in the one or the other direction by means of compressed air, which is let into the cylinder chamber either by means of a compressed air connector 42 in its rear portion or by means of a further compressed air connector 44 in its front portion. The cylinder cover 20 and the separating wall 40, along with a disk 46 resting against the rear of the latter, are used as end stops. The maximum stroke of the piston 36 between these two end stops is only approximately 3 to 5 mm in this example.

Figure 2:
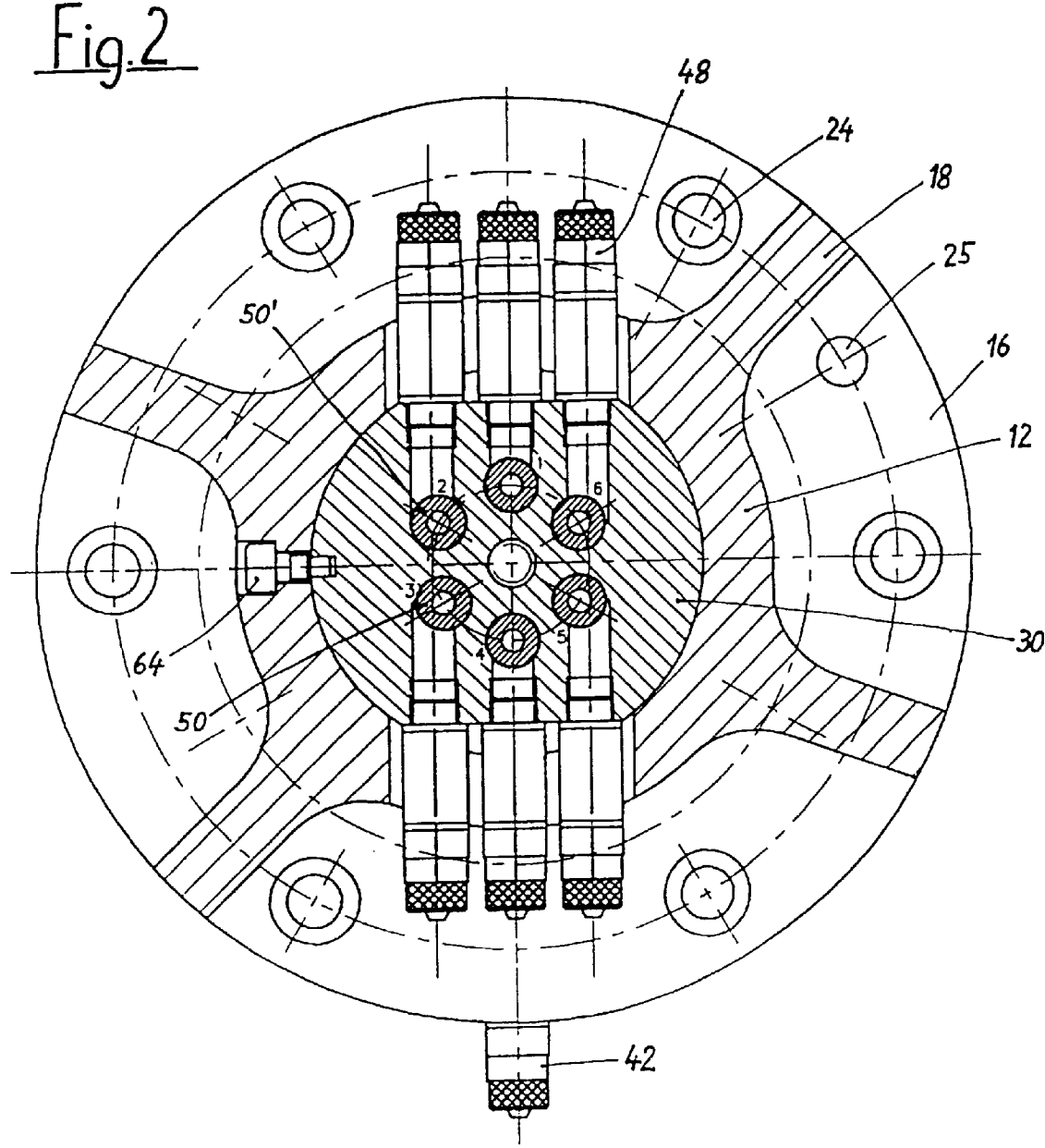
FIG. 2 is a cross section along the section line II—II in FIG. 1

Respectively three air connections 48 are screwed into the holder 30 at the top and bottom in a parallel arrangement (also see FIG. 2). Each of them is connected with one of six circularly arranged hollow bolts 50, which are tightly inserted into the holder 30, protrude at the front and constitute plug connectors. They sealingly cooperate with matching counter plug connectors 52 in the form of bores in a cover 54, which is pressed into the frontmost end of the tube-shaped boom. Air connections 56 have been screwed into the bores 52 on the inside and are connected via air supply lines, not represented, with gripper and other elements on the workpiece gripper, which can be actuated by compressed air or vacuum. The plug connections between the hollow bolts 50 and the counter plug connectors 52, 56 are created when the front tube section of the boom 10 is inserted into the collet chuck 14, 28. If it is desired that the two coupler elements can always be connected only in a defined relative rotational angular position, this can be done in a simple manner in that in accordance with FIG. 2 one of the plug connectors, in the example the one identified by 50', is not arranged on the same radius as the remaining air guide bolts 50.

In the exemplary embodiment of FIG. 1, the cover 54 has an outer flange edge, which covers the front face of the boom 10, and whose circumferential face forms a centering cone 58 with a pitch of 20°, for example. When the front end of the boom 10 is inserted into the collet chuck, the centering cone 58 comes to rest against a corresponding inner cone of the holder 30. Care must be taken that the mutual contact between the cone faces remains intact when the piston 38 is subsequently displaced to the right by means of compressed air being supplied through the air connector 44, and in the process takes the holder 30 and the longitudinally slit bushing 14 along for tightening the collet chuck. In the clamped state, the front tube section of the boom then is held in a centered manner on the one side within the clamping area of the collet chuck, i.e. in the area of the conical widening 28, and on the other side spaced apart from this clamping place by the centering cone 58 at the frontmost end. For releasing the coupler it is only necessary to displace the piston 38 by means of a compressed air supply through the air connector 42 toward the left in respect to FIG. 1. The perfect displacement of the holder 30 is assured by a slide ring insert 60, made of plastic, in the sliding surface of the cylinder bore of the housing 12, and inserting holes 62 of sufficient length in the axial direction in the cylindrical housing 12 permit the axial movement of the air connectors 48 together with the holder 30. So that the holder 30 is secure against rotation relative to the housing 12, it is provided with a longitudinal groove on its circumference, which, in accordance with FIG. 2, is engaged by the pin-like end of a securing screw 64.

Figure 3:
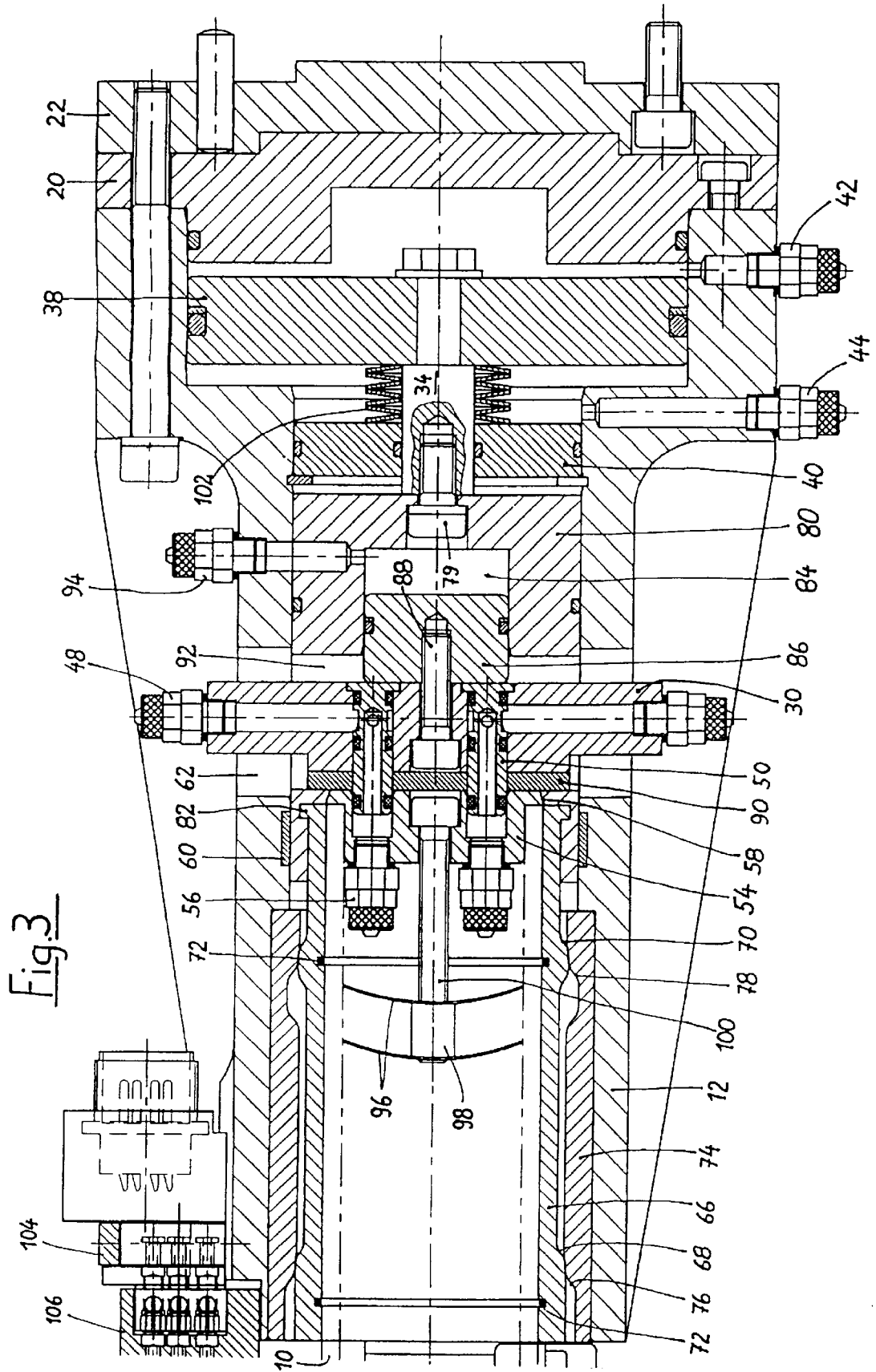
FIG. 3 shows an axial longitudinal section through another embodiment of a coupler.

In the exemplary embodiment of FIG. 3, many elements have the same function or even the same form as in the exemplary embodiment of FIGS. 1 and 2. These elements have been identified in FIG. 3 with the same reference numerals as in FIGS. 1 and 2. They need not be discussed in further detail.

One essential distinction of the embodiment of FIG. 3, over the exemplary embodiment described above, is that it uses a collet chuck 66 with two faces 68, 70 that widen conically toward the front. The two conical outer faces 68, 70 have a relatively great axial spacing, which is preferably greater than half the length of the collet chuck 66.

Such a collet chuck 66 expediently comprises segments to be made by axial severing cuts; these segments would coincide if they were not retained, on a radius which is somewhat greater than the radius of the tube section 10, by elastic, split snap rings 72, such as Seeger rings, which are seated in inner grooves of the segments of the collet chuck 66.

In a manner corresponding to the two conical outer faces 68, 70, a bushing-like insert 74 fixed in the housing 12 cooperates with the collet chuck 66 by way of two conical inner faces 76, 78 that have the same spacing as the outer faces 68 and 70. All the conical faces have at least two regions of different pitch. If to tighten the tube section 10 the collet chuck 66 is pulled to the right in terms of FIG. 3, then at first steeper conical faces cooperate and bring about a rapid radial tightening motion of the collet chuck 66. Upon further axial motion of the collet chuck 66 toward the right in terms of FIG. 3, the flatter regions of the conical faces come into action, so that tightening can be done no longer with the same radial speed but on the other hand with substantially greater force.

In the exemplary embodiment of FIG. 3, the piston rod 34 of the drive piston 38 is not solidly joined directly to the holder 30 but instead via a screw 79 it is joined to a cage 80, on which the holder 30 is supported in axially displaceable fashion. The end on the left, in terms of FIG. 3, of the substantially bushing-like cage 80 is provided with an inner annular groove, which is engaged by an annular rib 82 on the right-hand end of the segments of the collet chuck 66, so that upon an axial displacement of the cage 80 by means of the piston 38, the collet chuck 66 is carried along as well. The engaged connection between the segments of the collet chuck 66 and the cage 80 is embodied such that in the substantially radial tightening and release motion of the segments of the collet chuck 66, the annular rib 82 can execute a radial motion in the annular groove receiving it, and/or the segments of the collet chuck 66, beginning at their radially inner tightening position contacting the tube section 10, can execute a limited pivoting motion radially outward about their right-hand end.

As also seen in FIG. 3, the conical face 58 on the fixed part is provided not on the holder 30 but rather on the cage 80. The cage is guided in the bore of the housing 12. The right-hand end of the cage 80 forms a cylinder 84, in which a second piston 86 is guided axially displaceably. This piston is solidly connected via a screw 88 to the holder 30, whose left-hand side, in terms of FIG. 3, is formed by a damping plate 90. Because of the displaceability of the holder 30 together with the piston 86 relative to the cage 80, the air connections 48 extend not only through the holes 62 in the housing 12 but also through suitably long holes 92 in the circumferential wall of the cage 80. The displaceability of the holder 30 relative to the cage 80 makes it possible that after the introduction of the tube section 10 into the fixed part of the coupler, in a first step the tube section is precentered by means of the conical faces 58 and then the tube section 10 is tightened and thus centered by the segments of the collet chuck 66, before the plug connection between the hollow bolts 50 and the counterpart plug connectors 52, 56 is made. The construction of FIG. 3 has the advantage that whenever the tube section 10 is not introduced in a precisely centered position into the collet chuck 66, the cover 54 abutting the hollow bolts 50 displaces the holder 30 toward the right in terms of FIG. 3.

Once the collet chuck 66 has been tightened and the tube section thus centered, the cylinder 84 is acted upon by compressed air via an air connection 94, so that the piston 86 and the holder 30 are displaced to the left in terms of FIG. 3, and in the process the hollow bolts 50 penetrate into the counterpart plug connectors 52, 56. Because the plug connections are not made until after the tube section 10 is centered, damage to the seals and other contacting parts is averted.

A further improvement in the version of FIG. 3 over the exemplary embodiment of FIGS. 1 and 2 comprises the retention of the cover 54 on the end of the tube section 10 by means of one or more elastic disks 96, which are connected in the center to a threaded bush 98 and have a diameter which is somewhat greater than the inside diameter of the tube section 10, so that they flex on being pressed into the tube section, as shown in the drawing. A threaded bolt 100 that can be screwed into the threaded bush 98 tightens the cover 54 against the elastic disks 96 clamped in place in the tube section 10. To loosen the cover 54 from the tube section 10, the screw bolt 100 need merely be unscrewed. The elastic disks 96 are provided with holes for carrying the air and signal lines laid in the tube section 10.

Finally, as a further special feature of the version of FIG. 3, a spring 102 can be mentioned which seeks to urge the drive piston 38 toward the right, or in other words tends to tighten the collet chuck. This assures that the collet chuck will remain tightened even if the pressure in the compressed air connection 44 drops.

It is understood that the components of the fixed element and the connecting element of the coupler represented in the drawings and described above can be designed differently in detail. If no internal connectors for compressed air or vacuum are needed, parts 48 to 56 can be omitted, and the front face of the boom 10 could be provided with the centering cone 58. In both embodiments, with and without the cover 54, the connecting element of the coupler is considerably more simple and cost-effective to produce than with the power-operated couplers customary up to now. In place of a motor drive of the collet chuck by means of a linearly acting power cylinder, it would also be possible to employ a rotary drive which generates a linear movement, for example via a screw gear.

For making electrical connections, male plugs 104 and female plugs 106 can be mounted on the outside of the housing 12 and of the tube section 10. Upon the insertion of the tube section 10 into the collet chuck 66, the male and female plugs are brought into contact with one another.

What is claimed is:

1. A motor-actuable coupler for connecting workpiece grippers with a manipulating device, comprising:
    a connecting element on a workpiece gripper side including a tube section having a free end and a portion spaced from the free end; and
    a fixed element on a drive side including a collet chuck, the collet chuck including
      a) a front end,
      b) a centering area spaced from the front end which is engaged by the free end of the tube section to center the free end in the collet chuck, and
      c) a clamping area adjacent the front end which, upon actuation of the collet chuck with the free end of the tube section centered by the centering area, exerts a radial clamping force on the portion of the connecting element.

2. A coupler in accordance with claim 1, wherein the centering area is a second clamping area of the same or a second collet chuck spaced apart from the first-mentioned clamping area located at front end of the collet chuck.

3. The coupler of claim 2, wherein the collet chuck further comprises segments of a bushing severed multiple times longitudinally, the segments being held on a radius somewhat greater than a radius of the tube section by radially elastic rings that are inserted into internal annular grooves, rear ends of the segments engaging a cage in an axially fixed but limitedly radially movable manner, the cage being guided displaceably in a housing, and the segments being embodied with two outer conical faces which are disposed at an intermediate spacing of at least approximately half a length of one segment and widen toward the front end and which each cooperate with an inner conical face fitting them on the housing.

4. The coupler of claim 3, wherein the conical faces have one steeper region that is effective at an onset of a tightening operation and one flatter region effective subsequently.

5. The coupler of claim 3, wherein on the cage there is a conical face which cooperates in centering fashion with a conical face on the tube section.

6. The coupler of claim 3, characterized in that the cage is prestressed by a spring in the axial direction in which the cage tightens the collet chuck.

7. The coupler of claim 3, wherein on the cage there is a conical face which cooperates in centering fashion with a conical face on a cover closing the tube section.

8. The coupler of claim 7, wherein a holder connected to a piston is axially displaceably guided in the cage, and a plurality of compressed-air and/or vacuum connections are mounted on the holder, extending to the outside through holes in the cage and in the housing, the holes being dimensioned large enough to enable axial motions of the holder in the cage and the housing, and that after the collet chuck is tightened, the piston can be displaced forward toward the tube section by imposition of compressed fluid and in the process axially oriented plug connectors connected to the compressed-air or vacuum connections can be coupled tightly to fitting counterpart plug connectors mounted on the cover and communicating with pneumatically actuatable elements on the workpiece gripper.

9. A coupler in accordance with claim 1, wherein the free end of the tube section includes a cone surface and wherein the centering area includes a corresponding cone surface which receives the cone surface of the free end as the tube section is inserted into the collet chuck.

10. A coupler in accordance with claim 9, wherein the free end of the tube section is closed by a fitted or pressed in cover provided with the centering cone surface thereof.

11. A coupler in accordance with claim 9, wherein the collet chuck further includes
    a) a bushing which is conically widened on a longitudinally slit end,
    b) a fitted inner cone on a housing of the fixed element and receiving the slit bushing,
    further including a power cylinder for an axial movement of the slit bushing in relation to the housing, and
    wherein the centering cone surface of the collet chuck is provided on a holder connected with the slit bushing and a part of the power cylinder which is movable in relation to the housing.

12. A coupler in accordance with claim 11, wherein a piston of the power cylinder slides in a bore of the housing.

13. A coupler in accordance with claim 12, wherein the bore is closed at a rear end by a cover and wherein a tight separating wall is inserted in the bore between the piston of the power cylinder and the holder.

14. A coupler in accordance with claim 11,
    wherein the free end of the tube section is provided with a cover, and
    wherein the holder is equipped with several compressed air and/or vacuum connections, which extend outward through holes in the housing, which holes are of sufficient size for making axial movements of the holder in the housing possible, wherein, in the course of inserting the connecting element into the collet chuck, axially oriented plug connectors which are connected with the compressed air and/or vacuum connections are tightly connected with counter plug connectors arranged on the cover and connected with pneumatically actuable elements on the workpiece gripper.

* * * * *